US010066680B2

(12) United States Patent
Mellor

(10) Patent No.: US 10,066,680 B2
(45) Date of Patent: Sep. 4, 2018

(54) CABLE WRAP CLUTCH WITH TORQUE LIMITER SHUTOFF AND OPERATOR CONTROLLED RE-ENGAGEMENT

(71) Applicant: Inertia Dynamics LLC, New Hartford, CT (US)

(72) Inventor: Patricia M. Mellor, Torrington, CT (US)

(73) Assignee: Inertia Dynamics LLC, New Hartford, CT (US)

( * ) Notice: Subject to any disclaimer, the term of this patent is extended or adjusted under 35 U.S.C. 154(b) by 202 days.

(21) Appl. No.: 15/159,044

(22) Filed: May 19, 2016

(65) Prior Publication Data

US 2017/0335899 A1 Nov. 23, 2017

(51) Int. Cl.
| F16D 27/105 | (2006.01) |
| F16D 7/02 | (2006.01) |
| F16D 13/02 | (2006.01) |
| F16D 43/21 | (2006.01) |
| F16D 27/112 | (2006.01) |

(52) U.S. Cl.
CPC ........... *F16D 27/105* (2013.01); *F16D 7/022* (2013.01); *F16D 13/025* (2013.01); *F16D 27/112* (2013.01); *F16D 43/211* (2013.01); *F16D 7/025* (2013.01); *F16D 2300/18* (2013.01)

(58) Field of Classification Search
CPC ........ F16D 7/022; F16D 13/025; F16D 13/08; F16D 13/60; F16D 13/62; F16D 27/105; F16D 43/211; F16D 41/206
See application file for complete search history.

(56) References Cited

U.S. PATENT DOCUMENTS

| 1,436,830 | A | * | 11/1922 | Sumner | F16D 13/08 |
| | | | | | 192/37 |
| 2,734,606 | A | * | 2/1956 | Bellamy | F16D 27/105 |
| | | | | | 192/26 |
| 3,006,448 | A | * | 10/1961 | Fox | F16D 27/105 |
| | | | | | 192/40 |
| 5,620,372 | A | * | 4/1997 | Takada | F16D 7/022 |
| | | | | | 464/40 |
| 2003/0173178 | A1 | * | 9/2003 | Sasaki | B25B 21/02 |
| | | | | | 192/3.51 |

\* cited by examiner

*Primary Examiner* — Richard M Lorence
(74) *Attorney, Agent, or Firm* — Reising Ethington P.C.

(57) ABSTRACT

A rotational coupling includes input and output hubs disposed about a rotational axis and an attachment ring disposed about the axis on one side of the input hub opposite the output hub. A flexible, multi-coil body such as a cable is disposed radially outwardly of the input and output hubs and couples the hubs together for rotation upon rotation of the input hub in one rotational direction. The body has ends coupled to the output hub and attachment ring. A torque limiter includes a torque transmission plate configured to rotate with the input hub and an armature plate fixed against rotation. The torque transmission plate and armature plate are configured to move axially together along the axis of rotation. An electromagnet disposed on one side of the torque limiter opposite the input hub attracts the plates in a second axial direction away from the attachment ring when energized.

23 Claims, 2 Drawing Sheets

CABLE WRAP CLUTCH WITH TORQUE LIMITER SHUTOFF AND OPERATOR CONTROLLED RE-ENGAGEMENT

BACKGROUND OF THE INVENTION a. Field of the Invention

This disclosure relates to a rotational coupling device for a power transmission assembly. In particular, the disclosure relates to a wrap clutch in which torque is transmitted between input and output hubs using a cable to reduce frictional heat and wear during transition of the clutch between engaged and disengaged states. The cable reduces engagement forces and minimizes slip between the cable and hubs. In some embodiments, the clutch may also use a common structure to both disengage the clutch and limit torque in the event of excessive loads on the output hub.

b. Background Art

Wrap spring clutches are a common type of rotational coupling device used to control transfer of torque between two bodies. A conventional wrap spring clutch includes an input hub and an output hub. A spring is connected at one end to one of the hubs and to a control collar at the opposite end. The spring has an inner diameter that is slightly smaller than the outer diameter of the hubs. Rotation of the input hub in the direction of the spring winding constricts the spring and causes the spring to wrap down upon the hubs and couple the hubs for rotation. The spring is unwrapped, and the clutch released, when the hub to which the wrap spring is coupled stops or reverses direction or as the result of an external force that prevents rotation of the wrap spring.

During engagement and disengagement of the clutch, the spring will often slip. As the clutch is engaged and the spring is wrapping down, the spring will slip over the surface of the input hub until there is sufficient torque generated to drive the output hub. As the clutch is being disengaged, the spring will drag on the input hub until the spring fully unwraps. The friction of the spring against the input hub generates heat and wear that degrade the clutch over time.

The inventor herein had recognized a need for a rotational coupling device that will minimize and/or eliminate one or more of the above-identified deficiencies.

BRIEF SUMMARY OF THE INVENTION

This disclosure relates to a rotational coupling device for a power transmission assembly. In particular, the disclosure relates to a wrap clutch in which torque is transmitted between input and output hubs using a cable to reduce frictional heat and wear during transition of the clutch between engaged and disengaged states. The cable reduces engagement forces and minimizes slip between the cable and hubs. In some embodiments, the clutch may also use a common structure to both disengage the clutch and limit torque in the event of excessive loads on the output hub.

A rotational coupling device in accordance with one embodiment of the present teachings includes an input hub disposed about an axis of rotation and an output hub disposed about the axis of rotation on a first axial side of the input hub. The device further includes an attachment ring disposed about the axis of rotation on a second axial side of the input hub opposite the output hub. The device further includes a cable disposed radially outwardly of the input and output hubs. The cable has a first end coupled to the output hub and a second end coupled to the attachment ring and is configured to couple the input and output hubs together for rotation during rotation of the input hub in a first rotational direction.

A rotational coupling device in accordance with another embodiment of the present teachings includes an input hub disposed about an axis of rotation and an output hub disposed about the axis of rotation on a first axial side of the input hub. The device further includes an attachment ring disposed about the axis of rotation on a second axial side of the input hub opposite the output hub. The device further includes a flexible, multi-coil body disposed radially outwardly of the input and output hubs. The body has a first end coupled to the output hub and a second end coupled to the attachment ring and is configured to couple the input and output hubs together for rotation during rotation of the input hub in a first rotational direction. The device further includes a torque limiter. The torque limiter includes a torque transmission plate configured for rotation with the input hub and axially movable along the axis of rotation. The torque transmission plate is biased in a first axial direction towards engagement with the attachment ring. The torque limiter further includes an armature plate fixed against rotation, but axially movable along the axis of rotation. The armature plate is configured for axial movement with the torque transmission plate along the axis of rotation. The device further includes an electromagnet disposed on one side of the torque limiter opposite the input hub. The electromagnet is configured, when energized, to attract the armature plate and torque transmission plate in a second axial direction away from the attachment ring.

A rotational coupling device in accordance with the present teachings is advantageous relative to conventional coupling devices. The use of a cable in some embodiments of the invention reduces the friction that is found in conventional wrap spring clutches between the spring and hubs during engagement and disengagement of the clutch. As a result, heat and wear on the clutch are reduced. Further, some embodiments include a torque limiter that may be used both to limit torque transmission under excessive output loads and to disengage the clutch.

The foregoing and other aspects, features, details, utilities, and advantages of the invention will be apparent from reading the following detailed description and claims, and from reviewing the accompanying drawings illustrating features of this invention by way of example.

DETAILED DESCRIPTION OF THE INVENTION

Figure 1:
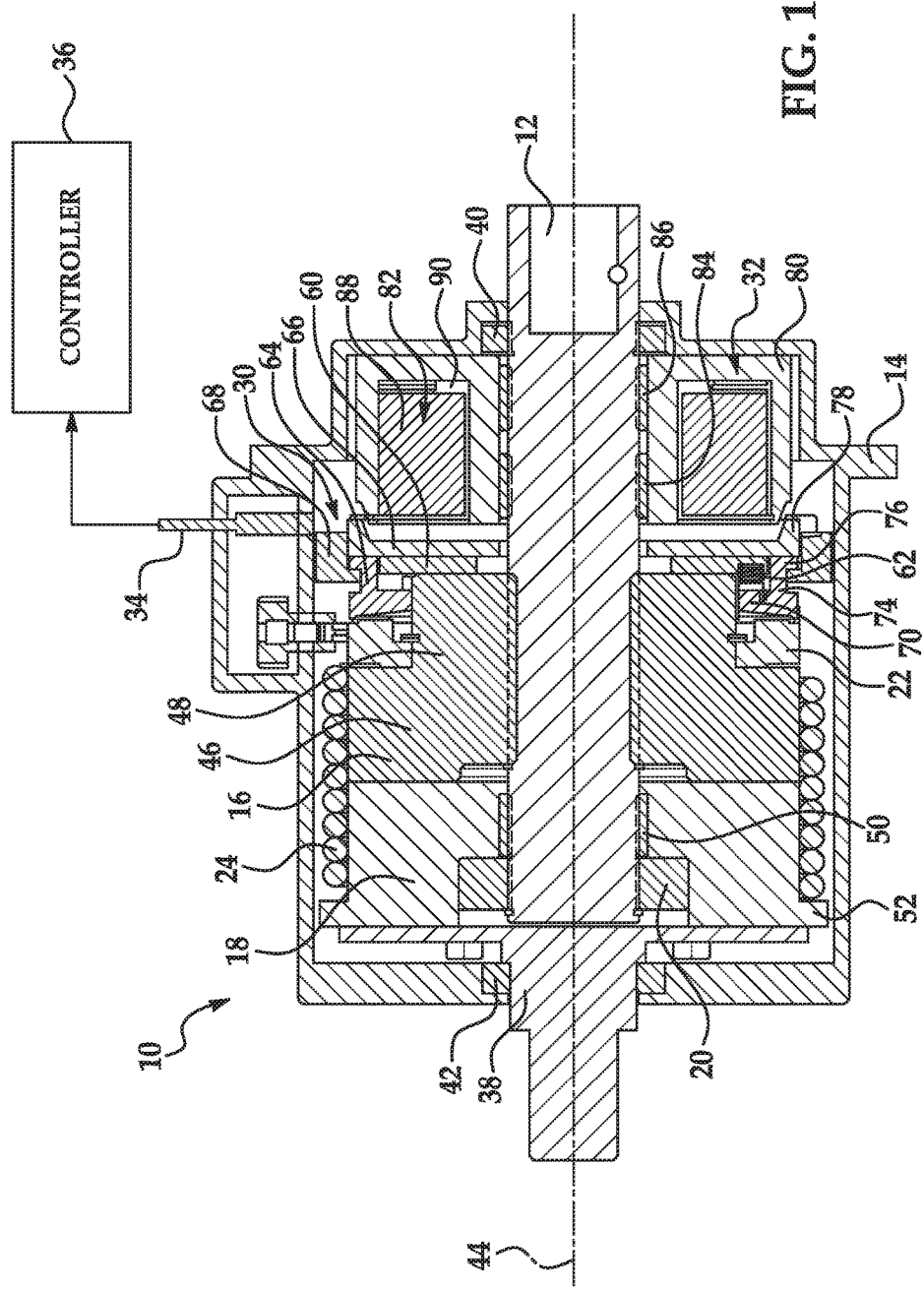
FIG. 1 is a cross-sectional drawing of a rotational coupling device in accordance with one embodiment of the present teachings showing the coupling device in an engaged state.

Referring now to the drawings wherein like reference numerals are used to identify identical components in the various views, FIG. 1 illustrates a rotational coupling device 10 in accordance with one embodiment of the present invention. Device 10 functions as a clutch to selectively transfer torque from an input shaft 12 to another device such as an output shaft. Device 10 may be provided for use in applications requiring relatively high horsepower, relatively low electric power and a torque limiting function such as agricultural row harvesting machines (for use with, for example, corn, cotton or sugar cane) in which power take off drives are used to power multiple sections of a harvesting head. It will be understood by those of ordinary skill in the art, however, that device 10 may be used in a wide variety of applications requiring a clutch with a torque limiter. Device 10 may include a housing 14, an input hub 16, an output hub 18, a one-way bearing or clutch 20, and an attachment ring 22. In accordance with various aspects of the present teachings, device 10 may further include a cable 24, means, such as friction element 26 and spring 28 (best shown in FIG. 2), for inhibiting rotation of the attachment ring 22 with the input hub 16, a torque limiter 30, an electromagnet 32, a motion sensor 34, and a controller 36.

Housing 14 provides structural support for components of device 10 and protects those components from foreign objects and environmental elements. Housing 14 may be made from conventional metals or plastics and may include multiple members coupled together using conventional fasteners such as bolts, screws, welds or adhesives. Housing 14 defines aligned openings at opposite ends configured to receive input shaft 12 and an output shaft 38. Bearings 40, 42, may be disposed within housing 14 and configured to supports shafts 12, 38, respectively, for rotation within housing 14.

Input hub 16 provides a means for transferring torque from an input device such as a shaft, pulley, gear, sprocket or sheave to output hub 18 through cable 24. Hub 16 is conventional in the art and may be made from conventional metals and metal alloys and may, for example comprise an oil impregnated sintered iron hub. Hub 16 is annular and is disposed about a rotational axis 44. In the illustrated embodiment, hub 16 is disposed about input shaft 12 and is rotatably coupled to shaft 16 which may be centered about axis 44 and may be driven by an engine, electric motor or other conventional power source. Hub 16 may be joined to shaft 12 using a conventional key/keyway relationship or in another conventional manner. Alternatively, hub 16 may be integrated with input shaft 12 such that hub 16 and shaft 12 form a unitary or one-piece structure. The outer diameter of hub 16 may vary along the axial length of hub 16. In particular, hub 16 includes a portion 46 disposed at one axial end and having a radially outer surface which cable 24 wraps down upon during engagement of the clutch. Hub 16 also includes a portion 48 disposed at the other axial end and having a reduced diameter relative to portion 46. Portion 48 is configured to be received within attachment ring 22 and a portion of torque limiter 30 as described in greater detail below.

Output hub 18 provides a means for transferring torque from input hub 16 to an output member such as a shaft, pulley, gear, sprocket or sheave. In the illustrated embodiment, hub 18 transfers torque to output shaft 38. Although the illustrated embodiment is configured for a shaft input member and a shaft output member, it should be understood that hubs 16, 18 could be configured for attachment to a variety of input and output members. Hub 18 is conventional in the art and may be made from conventional metals and metal alloys and may, for example comprise an oil impregnated sintered iron hub. Hub 18 is annular and is disposed about axis 44 and may be coaxially aligned with input hub 12. Hub 18 is sized to receive one end of input shaft 12 along with one-way bearing 20 and a needle bearing 50 disposed between the radially inner surface of hub 18 and input shaft 12. Hub 18 may define a flange 52 at one axial end to which one end of cable 24 may be affixed or anchored. Flange 52 also limits movement of cable 24 in one direction along axis 44. A radially outer surface of hub 18 provides an engagement surface for cable 24 upon engagement of the clutch. When the clutch is not engaged, input hub 16 and output hub 18 are capable of relative rotation.

One-way bearing 20 provides a means for preventing rotation of output hub 18 in one rotational direction (i.e. in a direction opposite the driving direction of the clutch). Bearing 20 is conventional in the art. Bearing 20 is annular and is disposed about axis 44 between input shaft 12 and a radially inner surface of output hub 18. Although bearing 20 is used in the illustrated embodiment to prevent reverse rotation of output hub 18, it should be understood that other mechanisms could be used to accomplish the same result including, for example, a pawl and ratchet, an anti-rotation spring, a cam, or a brake band as well as friction within the drive system such that torque required to reverse rotation of hub 18 exceeds the torque required to open cable 24.

Figure 2:
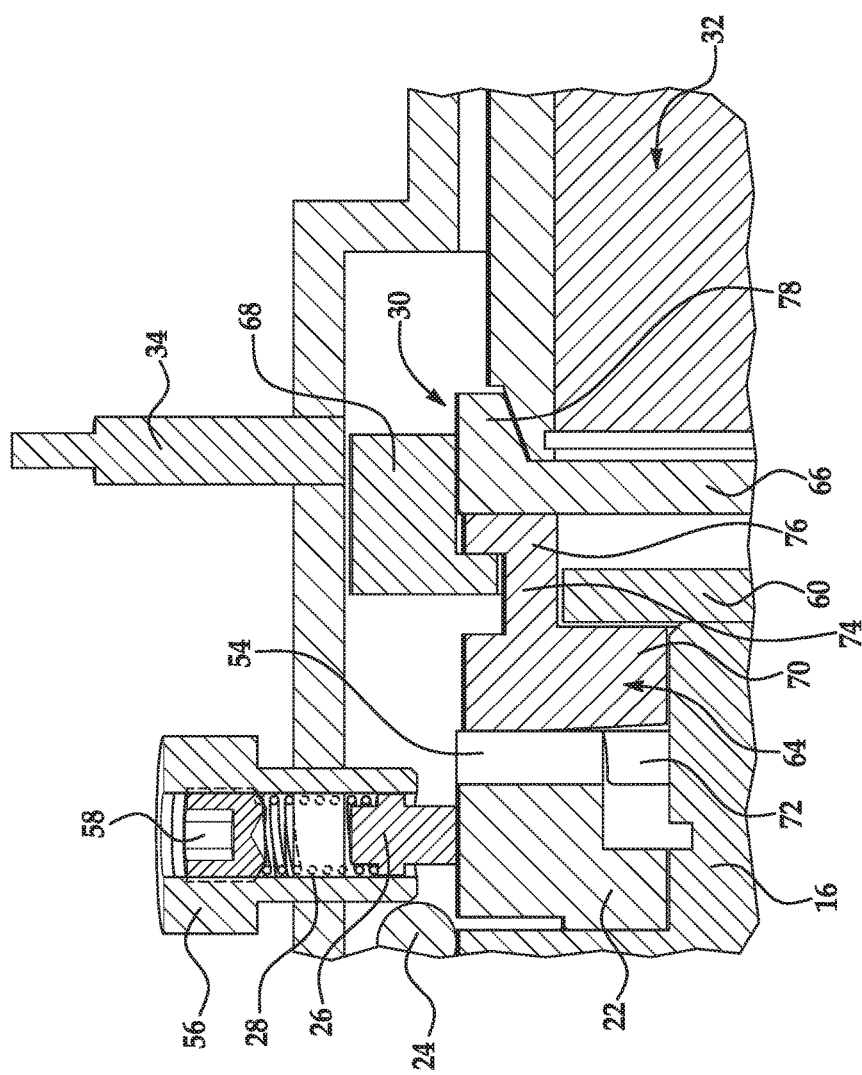
FIG. 2 is a cross-sectional drawings of a portion of the rotational coupling device of FIG. 1, showing the coupling device in a disengaged state.

Attachment ring 22 provides an attachment point for one end of cable 24. Ring 22 is annular in shape and is disposed about axis 44. Ring 22 is disposed on an axial side of input hub 16 opposite output hub 18 and, in particular, is disposed about portion 48 of input hub 16. Ring 22 is configured to allow input hub 16 to rotate freely within ring 22 when the clutch is disengaged. Referring to FIG. 2, one axial end of ring 22 facing away from portion 48 of input hub 16 defines a plurality of axially extending teeth 54 for use in engaging the clutch as described below.

Referring again to FIG. 1, cable 24 having a round cross-section is provided to couple input hub 16 and output hub 18 together for rotation. Cable 24 includes a plurality of wires that may be made from conventional metals and metal alloys including various steels. The cables may be wound into a helix and the cable may comprise a wire rope. Cable 24 is disposed radially outwardly of output hub 18 and input hub 16 (particularly portion 46 of input hub 16) and is affixed or anchored at one end to flange 52 of output hub 18 and at an opposite end to attachment ring 22. The use of cable 24 as compared to a spring has several advantages. Unlike a spring, cable 24 does not have a rest or equilibrium position or state and does not exert a spring force when deformed from that position or state. Because cable 24 is relatively flexible and loose and not stiff like a spring, cable 24 does not tend to slip during engagement of the clutch and does not produce frictional heat and wear. Further, because cable 24 is not as stiff as a spring, the clutch can be disengaged with relatively low forces acting on cable 24. In addition to reducing frictional heat and wear, this allows the clutch to be much larger and to be used in applications requiring larger amounts of torque. Conversely, springs in larger clutches and high torque applications must have a relatively large cross-section that renders them very stiff. This stiffness requires substantial forces to disengage the clutch. Traditional forces that are used for wrap spring clutches are inertia in the system. These forces may not be available in applications where the mass of the components is insufficient and/or speeds are too low. Although the illustrated embodiment of device 10 includes cable 24, it should be understood that the disclosed device could function by replacing cable 24 with a spring or another flexible, multi-coil body.

Referring again to FIG. 2, friction element 26 and spring 28 provide a means for inhibiting rotation of attachment ring 22 with input hub 16. Attachment ring 22 is sized such that input hub 16 may rotate within ring 22 when the clutch is disengaged. However, friction between hub 16 and the radially inner surface of ring 22 may urge ring 22 to rotate with input hub 16 even when the clutch is disengaged. Friction element 26 and spring 28 apply an opposing friction force to a radially outer surface of ring 22 to inhibit rotation of ring 22 when the clutch is disengaged. Referring to FIG. 2, friction element 26 and spring 28 may be disposed within an internally threaded sleeve 56 that is inserted through an opening in housing 14. Spring 28 may be seated between element 26 and a set screw 58 disposed within sleeve 56. The forced exerted by friction element 26 against ring 22 may be adjusted by adjusting the position of the set screw 58. Friction element 26 may be made from conventional friction materials of the type used in automotive clutch and brake applications.

Torque limiter 30 is provided to limit torque transmission between hubs 16, 18 in order to prevent damage to device 10 from excessive loads on output shaft 38. In accordance with one aspect of the present teachings, torque limiter 30 also may be used for controlled disengagement and re-engagement of the clutch. Torque limiter 30 is disposed on one axial side of ring 22 opposite input hub 16. Torque limiter 30 includes a spring mounting plate 60, multiple springs 62 disposed about axis 44, a torque transmission plate 64, an armature plate 66 and a clamp ring 68.

Spring mounting plate 60 provides seats for springs 62. Plate 60 is annular in shape and includes a plurality of recesses in one axial side with each recess configured to receive one end of a corresponding spring 62. Plate 60 may be secured to input hub 16 after insertion of torque limiter 30 into housing 14 using conventional fasteners that are inserted through openings in armature plate 66 and then through aligned openings in plate 60 and hub 16.

Springs 62 are provided to bias torque transmission plate 64 towards ring 22 and into engagement with ring 22. Springs 62 may comprise conventional coil springs. Springs 62 are disposed between spring mounting plate 60 and torque transmission plate 64 and are seated within aligned recesses formed in plates 60, 64.

Torque transmission plate 64 transmits torque from input hub 16 to ring 22 during engagement of the clutch. Plate 64 is annular in shape and may be disposed about, and centered about axis 44. Plate 64 is configured to rotate with input hub 16 and may be coupled to input hub 16 using a spline or key/keyway interface. Plate 64 is also configured for movement along axis 44 relative input hub 16. A radially extending portion 70 of plate 64 has an inner diameter sized to receive portion 48 of input hub 16. One side of portion 70 defines a plurality of recesses, each of which is configured to seat one end of a corresponding spring 62. Referring to FIG. 2, the other side of portion 70 defines a plurality axially extending teeth 72 configured for engagement with teeth 54 on ring 22. When excessive loads are applied to output shaft 38, the profiles of the teeth 54, 72 on ring 22 and plate 64 will force plate 64 away from ring 22 thereby uncoupling ring 22 and plate 64 and disengaging the clutch to prevent damage to device 10. The load necessary to cause disengagement of plate 64 from ring 22 is determined by the spring force of springs 62 and may, therefore, be varied by using different springs 62. An axially extending portion 74 of plate extends from portion 70 in a direction away from ring 22 and hubs 16, 18 and towards armature plate 66. Portion 74 terminates in a radially extending flange 76 that may be trapped between clamp ring 68 and armature plate 66 in such a way that torque transmission plate 64 is capable of rotation relative to clamp ring 68 and armature plate 66, but is incapable of translational (axial) movement relative to clamp ring 68 and armature plate 66.

Armature plate 66 forms part of an electromagnetic circuit used to disengage torque transmission plate 64 from attachment ring 22 and thereby disengage the clutch. Armature plate 66 may be made from magnetically permeable and conductive materials such as steel. Armature plate 66 is annular in shape and may be disposed about, and centered about, axis 44. Armature plate 66 may include an axially extending flange 78 at a radially outer periphery that extends toward electromagnet 32. The flange 78 may include a radially inner surface that is beveled and shaped complementary to a surface on electromagnet 32 to facilitate longer stroke length to engage and align armature plate 66 and electromagnet 32. Armature plate 66 is coupled to clamp ring 68 and fixed against rotation through the attachment to clamp ring 68. Armature plate 66 is axially movable along axis 44 towards and away from electromagnet 32 and is configured for axial movement with torque transmission plate 64 along axis 44.

Clamp ring 68 is provided to couple torque transmission plate 64 and armature plate 66 for axial movement along axis 44. Clamp ring 68 is annular in shape and may be disposed about, and centered about, axis 44. Clamp ring 68 is disposed radially outwardly of torque transmission plate 64 and armature plate 66. Clamp ring 68 defines a radially inwardly extending flange at one axial end configured to face a portion of armature plate 66 and to define a recess between the flange and armature plate 66 into which the radially extending flange 76 of portion 74 of torque transmission plate 64 extends. Clamp ring 68 may include a plurality of radially outwardly extending tabs (not shown) on a radially outer surface configured to mesh with corresponding grooves formed in a radially inner surface of housing 14. As a result, clamp ring 68 is prohibited from rotating about axis 44, but is capable of translational (axial) movement along axis 44 along with armature plate 66 and torque transmission plate 64. Clamp ring 68 and armature plate 66 may be coupled to one another using conventional fasteners such as screws or bolts.

Electromagnet 32 is provided for use in disengaging the clutch. Electromagnet 32 is disposed on one side of torque limiter 30 opposite input hub 16. When energized, electromagnet 32 forms a magnetic circuit with armature plate 66 and attracts armature plate 66—and, as a result, clamp ring 68 and torque transmission plate 64—in one axial direction towards electromagnet 32 and away from attachment ring 22. Electromagnet 32 includes a field shell or housing 80 and a conduction assembly 82.

Housing 80 is provided to house conduction assembly 82. Housing 80 also forms part of a magnetic circuit that causes the selective engagement of armature plate 66 and electromagnet 32. Housing 80 may be made from conventional metals and metal alloys, including steel. Housing 80 is cylindrical and is disposed about axis 44. Housing 80 is supported on the outer races of a pair of needle bearings 84, 86 disposed about input shaft 12. Housing 80 is fixed against rotation about axis 44 by screws attaching housing 80 to housing 14.

Conduction assembly 82 is provided to create a magnetic circuit among armature plate 66 and electromagnet 32 to cause movement of armature plate 66 along axis 44 into engagement with housing 80 and thereby disengage torque transmission plate 64 from attachment ring 22. Conduction assembly 82 is generally annular and is disposed about axis 44 within housing 80. Assembly 82 includes a conductor 88 and a conductor shell 90.

Conductor 88 may comprise a conventional copper coil although other known conductors may alternatively be used.

Conductor 88 may be connected electrically to a power supply (not shown) such as a battery. Upon energization of conductor 88, an electromagnetic circuit is formed between armature plate 66 and housing 80.

Conductor shell 90 is provided to house conductor 88 and is also used to mount conductor 88 within housing 80. Shell 90 may be molded from conventional plastics. Shell 90 may include an integral terminal connector (not shown) through which conductor 88 may be electrically connected to a power source. Shell 90 may also define one or more lugs sized to be received within recesses in housing 14 to prevent rotation of conduction assembly 82.

Motion sensor 34 generates a signal indicative of movement of torque limiter 30. As mentioned above, excessive loads on output shaft 38 will cause displacement of torque transmission plate 64 along axis 44 in a direction away from attachment ring 22 due to the profiles of the teeth 54, 72 on ring 22 and plate 64, respectively. This movement will cause corresponding movement of armature plate 66 and clamp ring 68. Motion sensor 34 detects this movement and generates a signal indicative of the movement that may be provided to controller 36. Motion sensor 34 may comprise a sensor that generates microwave or ultrasound waves and detects the reflection of those waves in order to determine whether an object is in the path of the wave. Motion sensor 34 may alternatively comprise a piezoelectric sensor, inductive or contact based sensor. It should be understood, however, that various types of motion sensors may be used. Motion sensor 34 may be disposed within an opening in housing 14.

Controller 36 is provided to control the flow of current to conductor 88 and, therefore, activation of the electromagnetic circuit. Controller 36 may comprise a programmable microprocessor or microcontroller or may comprise an application specific integrated circuit (ASIC). Controller 36 may include a central processing unit (CPU) and an input/output (I/O) interface through which controller 36 may receive a plurality of input signals including those generated by motion sensor 34 and generate a plurality of output signals including those used to control delivery of current to conductor 88. Controller 36 may be configured with appropriate programming instructions (i.e. software) to energize electromagnet 32 and disengage the clutch in response to signals generated by motion sensor 34, manual inputs by an operator of device 10, or automated processes based on parameters associated with the operation of device 10. In accordance with one aspect of the present teachings, upon receipt of a signal from motion sensor 34 indicating movement of torque limiter 30, controller 36 generates an activation signal configured to cause delivery of current to electromagnet 32 and energize electromagnet 32. In this manner, device 10 is able to quickly disengage the clutch in response to excessive loads on output shaft 38. Further, because the electromagnet 32 maintains the position of torque limiter 30, repeated re-engagement and disengagement of torque transmission plate 64 with ring 22 is prevented thereby reducing wear on torque limiter 30 and extending the life of torque limiter 30.

During normal operation, rotation of input shaft 12 causes corresponding rotation of input hub 16 and torque transmission plate 64. Because the teeth 72 of plate 64 engage the teeth 54 in attachment ring 22, ring 22 also rotates and wraps cable 24 down upon input hub 16 to engage the clutch. Torque from input hub 16 is then transferred to output hub 18 and output shaft 38 through cable 24. If it is desirable to disengage the clutch, current is provided to conductor 88 of electromagnet 32. The current in electromagnet 32 generates an electromagnetic circuit including housing 80 of electromagnet 32 and armature plate 66 that draws armature plate 66, clamp ring 68 and torque transmission plate 64 towards electromagnet 32 thereby disengaging torque transmission plate 64 from attachment ring 22. Rotation of attachment ring 22 ceases thereby causing cable 24 to unwrap from input hub 16 and terminate torque transmission from input hub 16 to output hub 18. When it is desired to re-engage the clutch, current delivery to conductor 88 is halted by an operator of device 10 or an automated process. Springs 62 urge torque transmission plate 64 back into engagement with attachment ring 22. As discussed above, the clutch may also be disengaged when excessive loads are placed on output shaft 38. In particular, the loads cause torque transmission plate 64 of torque limiter 30 to separate from attachment ring 22. This movement is detected by motion sensor 34 which causes controller 36 to provide current to electromagnet 32 and fully disengage the clutch.

A rotational coupling device 10 in accordance with the present teachings is advantageous relative to conventional coupling devices. In particular, the use of cable 24 in some embodiments of the invention reduces the friction, engagement forces and stress that is found in conventional wrap spring clutches between the spring and hubs 16, 18 during engagement and disengagement of the clutch. As a result, heat, wear and fatigue of the helical component of the clutch are reduced. Further, the torque limiter 30 used in various embodiments may be used both to limit torque transmission under excessive output loads and to disengage the clutch.

While the invention has been shown and described with reference to one or more particular embodiments thereof, it will be understood by those of skill in the art that various changes and modifications can be made without departing from the spirit and scope of the invention.

What is claimed is:
1. A rotational coupling device, comprising:
an input hub disposed about an axis of rotation;
an output hub disposed about the axis of rotation on a first axial side of the input hub;
an attachment ring disposed about the axis of rotation on a second axial side of the input hub opposite the output hub; and,
a cable having a round cross-section disposed radially outwardly of the input and output hubs, the cable having a first end coupled to the output hub and a second end coupled to the attachment ring and configured to couple the input and output hubs together for rotation during rotation of the input hub in a first rotational direction.
2. A rotational coupling device, comprising:
an input hub disposed about an axis of rotation;
an output hub disposed about the axis of rotation on a first axial side of the input hub;
an attachment ring disposed about the axis of rotation on a second axial side of the input hub opposite the output hub; and,
a cable disposed radially outwardly of the input and output hubs, the cable having a first end coupled to the output hub and a second end coupled to the attachment ring and configured to couple the input and output hubs together for rotation during rotation of the input hub in a first rotational direction;
a torque limiter having
a torque transmission plate configured for rotation with the input hub and axially movable along the axis of rotation, the torque transmission plate biased in a first axial direction towards engagement with the attachment ring; and, an armature plate fixed against rotation, but axially movable along the axis of rotation, the armature plate configured for axial movement with the torque transmission plate along the axis of rotation;

an electromagnet disposed on one side of the torque limiter opposite the input hub, the electromagnet configured, when energized, to attract the armature plate and torque transmission plate in a second axial direction away from the attachment ring.

3. The rotational coupling device of claim 2 wherein the torque limiter further includes a clamp ring coupled to the armature plate and a portion of the torque transmission plate is disposed axially between the clamp ring and the armature plate.

4. The rotational coupling device of claim 2 wherein the torque limiter further includes a spring mounting plate configured for attachment to the input hub and at least one spring disposed between the spring mounting plate and the torque transmission plate and biasing the torque transmission plate in the first axial direction.

5. The rotational coupling device of claim 2 wherein the torque limiter is disposed on one axial side of the attachment ring opposite the input hub.

6. The rotational coupling device of claim 2, further comprising a motion sensor configured to generate a motion signal indicative of movement of the torque limiter in the second axial direction.

7. The rotational coupling device of claim 6, further comprising a controller configured to generate an activation signal in response to receipt of the motion signal, the activation signal configured to cause energization of the electromagnet.

8. The rotational coupling device of claim 2, further comprising means for inhibiting rotation of the attachment ring with the input hub when the torque transmission plate is disengaged from the attachment ring.

9. The rotational coupling device of claim 8 wherein the rotation inhibiting means includes a friction element and a spring that biases the friction element against a radially outer surface of the attachment ring.

10. The rotational coupling device of claim 2 wherein the attachment ring includes a plurality of teeth on one axial side of the attachment ring and the torque transmission plate includes a plurality of teeth on one axial side of the torque transmission plate configured for engagement with the plurality of teeth of the attachment ring.

11. A rotational coupling device, comprising:
an input hub disposed about an axis of rotation;
an output hub disposed about the axis of rotation on a first axial side of the input hub;
an attachment ring disposed about the axis of rotation on a second axial side of the input hub opposite the output hub;
a flexible, multi-coil body disposed radially outwardly of the input and output hubs, the body having a first end coupled to the output hub and a second end coupled to the attachment ring and configured to couple the input and output hubs together for rotation during rotation of the input hub in a first rotational direction;

a torque limiter having
a torque transmission plate configured for rotation with the input hub and axially movable along the axis of rotation, the torque transmission plate biased in a first axial direction towards engagement with the attachment ring; and, an armature plate fixed against rotation, but axially movable along the axis of rotation, the armature plate configured for axial movement with the torque transmission plate along the axis of rotation; and, an electromagnet disposed on one side of the torque limiter opposite the input hub, the electromagnet configured, when energized, to attract the armature plate and torque transmission plate in a second axial direction away from the attachment ring.

12. The rotational coupling device of claim 11 wherein the flexible, multi-coil body comprises a cable.

13. The rotational coupling device of claim 11 wherein the torque limiter further includes a clamp ring coupled to the armature plate and a portion of the torque transmission plate is disposed axially between the clamp ring and the armature plate.

14. The rotational coupling device of claim 11 wherein the torque limiter further includes a spring mounting plate configured for attachment to the input hub and at least one spring disposed between the spring mounting plate and the torque transmission plate and biasing the torque transmission plate in the first axial direction.

15. The rotational coupling device of claim 11 wherein the torque limiter is disposed on one axial side of the attachment ring opposite the input hub.

16. The rotational coupling device of claim 11, further comprising a motion sensor configured to generate a motion signal indicative of movement of the torque limiter in the second axial direction.

17. The rotational coupling device of claim 16, further comprising a controller configured to generate an activation signal in response to receipt of the motion signal, the activation signal configured to cause energization of the electromagnet.

18. The rotational coupling device of claim 11, further comprising means for inhibiting rotation of the attachment ring with the input hub when the torque transmission plate is disengaged from the attachment ring.

19. The rotational coupling device of claim 18 wherein the rotation inhibiting means includes a friction element and a spring that biases the friction element against a radially outer surface of the attachment ring.

20. The rotational coupling device of claim 11 wherein the attachment ring includes a plurality of teeth on one axial side of the attachment ring and the torque transmission plate includes a plurality of teeth on one axial side of the torque transmission plate configured for engagement with the plurality of teeth of the attachment ring.

21. The rotational coupling device of claim 1 wherein the cable comprises a wire rope.

22. The rotational coupling device of claim 1 wherein the cable comprises a plurality of wound wires.

23. The rotational coupling device of claim 1 wherein the cable does not exert a spring force when coupling the input and output hubs together for rotation.

* * * * *